United States Patent [19]

Dubourg

[11] 4,304,667
[45] Dec. 8, 1981

[54] FILTER FOR PURIFYING A FLUID CONTAINING FERROMAGNETIC PARTICLES

[75] Inventor: Michel Dubourg, Le Mesnil Saint Denis, France

[73] Assignee: Framatome, Courebevoie, France

[21] Appl. No.: 99,082

[22] Filed: Nov. 30, 1979

[30] Foreign Application Priority Data

Feb. 23, 1979 [FR] France .................................. 79 04739

[51] Int. Cl.³ ............................................. B01D 35/06
[52] U.S. Cl. .................................................... 210/223
[58] Field of Search ............... 210/222, 223, 279, 263, 210/347

[56] References Cited

U.S. PATENT DOCUMENTS

| | | | |
|---|---|---|---|
| 2,943,739 | 7/1960 | Mayard | 210/446 |
| 3,451,554 | 6/1969 | Wade | 210/279 |
| 3,539,509 | 11/1970 | Heitmann et al. | 210/222 |
| 3,557,955 | 1/1971 | Hirs | 210/279 |
| 3,567,026 | 3/1971 | Kolm | 210/222 |
| 3,625,365 | 12/1971 | Armstrong | 210/279 |
| 3,869,390 | 3/1975 | Heitmann | 210/222 |
| 3,979,288 | 9/1976 | Heitmann | 210/222 |
| 4,191,651 | 3/1980 | Cheysson | 210/279 |

FOREIGN PATENT DOCUMENTS

| | | | |
|---|---|---|---|
| 2655630 | 6/1978 | Fed. Rep. of Germany | 210/222 |
| 2914497 | 10/1979 | Fed. Rep. of Germany | 210/222 |
| 1204324 | 9/1970 | United Kingdom | 210/222 |

OTHER PUBLICATIONS

Use of Electromagnetic Filters in Nuclear Power Plants,–H. G. Heitmann–International Conference on Water Chemistry of Nuclear Reactor Systems—Bournemouth (U.K.) Oct. 24-27, 1977.

Primary Examiner—Theodore A. Granger
Attorney, Agent, or Firm—Haseltine & Lake

[57] ABSTRACT

The invention relates to a filter for purifying a fluid containing ferromagnetic particles.

The filter comprises a cylindrical envelope containing steel beads between which the fluid to be purified passes, and a device, at the periphery of the envelope, for magnetizing the beads. It also comprises at least one plate for supporting the beads, which is pierced with holes and arranged transversely at a certain height in the envelope. The fluid is introduced and discharged by means of pipes, one of which opens in the envelope below the plate for supporting the beads, and the other of which passes through the bed of beads, from the bottom, and opens above the bed of beads and below the top of the envelope of the filter.

The invention applies in particular to the filtration of the pressurized water of a nuclear reactor using pressurized water.

4 Claims, 4 Drawing Figures

FILTER FOR PURIFYING A FLUID CONTAINING FERROMAGNETIC PARTICLES

The invention relates to a filter for purifying a fluid containing ferromagnetic particles and more particularly but not exclusively for purifying the cooling fluids of watercooled nuclear reactors.

In pressurized water reactors, the pressurized water, which constitutes the primary fluid and which comes into contact with the fuel rods before being sent into the steam generators in order to heat and vaporize the boiler feed water or secondary fluid, becomes charged, during its circulation in the reactor and in the steam generators, with iron oxide particles formed during the prolonged contact of the water with certain steel parts of the nuclear reactor.

In boiling water reactors, the water in the main circuit comes into contact with the fuel rods and vaporizes. The steam thus produced feeds the turbine. The condensed water becomes charged with particles in the water tank. The water is reintroduced into the reactor and circulates by means of circulating pumps which ensure a forced circulation in the vessel by means of ejectors. The oxide particles tend to become activated and to deposit on the fuel assemblies when vaporization takes place.

It is very important to remove these oxide particles from the fluid by means of a filter, in order to prevent the amount of oxide in this fluid from becoming excessive and to prevent these particles from becoming activated after having resided in the core and from depositing on the components, making a significant contribution to the activity and to the contamination of the surfaces.

The particles trapped by the filter can no longer circulate in the circuits and contamination of the operating and maintenance personnel is thus prevented; the personnel can therefore remain near the reactor installations for a longer time without suffering prohibitive irradiation.

This purification of the fluid must of course be carried out while the reactor is in operation in order to ensure continuous purification of the water.

The difficulty arises from the fact that this filtration must be effected on water at high temperature and at high pressure.

In order to effect this purification, it has been proposed to use an electromagnetic filter comprising a cylindrical envelope filled with beads of a ferromagnetic material, and more particularly steel beads, which are subjected to a magnetization cycle so that these beads can retain the ferromagnetic particles conveyed by the fluid.

A filter of this type, which comprises a magnetizing device surrounding the cylindrical envelope in which the beads are located, in order to create a magnetic field capable of magnetizing the beads, is generally arranged in parallel with a pump used for the circulation of the water.

A proportion of the fluid flow, which is generally of the order of a few % of the total flow of this fluid, is diverted to the filter.

It is thus possible to purify the fluid continuously without thereby interfering with the circulation of this fluid in the circuits of the reactor and without thermal degradation (cooling) of the fluid.

In the electromagnetic filters used hitherto, the stream of fluid to be purifed enters through one end of the filter, via a pipe passing through one of the end plates of the cylindrical envelope, passes through the layer of steel beads and leaves through the other end of the filter, via a pipe passing through the other end plate of the cylindrical envelope, in order to be recycled into the circuit.

In a filter of this type, the oxide scale tends to deposit constantly in the same zones of the mass of steel beads, since the fluid circulates along a constant path, and the effectiveness of the filtration is not optimum because the passage of the fluid through the bed of beads is relatively short unless a very large filter, which is bulky and expensive, is used.

New types of filters which make it possible to overcome these disadvantages have therefore been proposed. In particular, French Pat. No. 78/28,525 of Oct. 5, 1978, describes a filter which is very effective despite its low bulk and relatively simple structure.

In a filter of this type, the passage of the fluid to be purified takes place partially in radial directions and partially in axial directions, relative to the cylindrical envelope of the filter. Deflectors are provided inside the filter together with zones possessing holes which are adequate for obtaining an optimum passage of the fluid.

In a filter of this type, the fluid to be purified penetrates into the cylindrical envelope via a pipe passing through one of the end plates of the envelope and leaves via another pipe passing through the other end plate of the cylindrical envelope.

Dismantling of one of the plates of the cylindrical envelope of the filter, in order to reach the bed of beads for checking or maintenance purposes, therefore involves dismantling the pipe connected to this plate. This disadvantage exists in the case of all the known filters used hitherto.

Furthermore, in order to assist the maintenance of the filter, the structure of the filter inside the cylindrical envelope is preferably designed to be extremely simple and to provide good accessibility to the bed of beads.

According to the present invention there is provided a filter for purifying a fluid at high pressure and at high temperature and containing ferromagnetic particles, said filter comprising:

a cylindrical envelope having an axis of symmetry which is vertical;

upper and lower plates closing the ends of said envelope;

steel beads within said envelope;

means provided at the periphery of said envelope for magnetizing said beads;

at least one support plate for supporting said beads in said envelope, said support plate being provided with holes, being arranged transversely to said axis of said envelope, and being spaced from said lower plate so that a free space is created between said support plate and said lower plate;

a first pipe passing through said lower plate and opening into said free space; and a second pipe passing through said lower plate, extending substantially vertically through said beads and opening below said upper plate;

said pipes constituting means for introducing fluid to be purified into said filter and for discharging filtered fluid therefrom.

An embodiment of a filter according to the invention, for purification of the primary fluid of a nuclear reactor using pressurized water, will now be described with reference to the accompanying drawings.

In the drawings:

FIG. 1 schematically represents the embodiment of the filter viewed in section, and the arrangement of the filter in the primary water piping of a pressurized water reactor;

Figure 1:
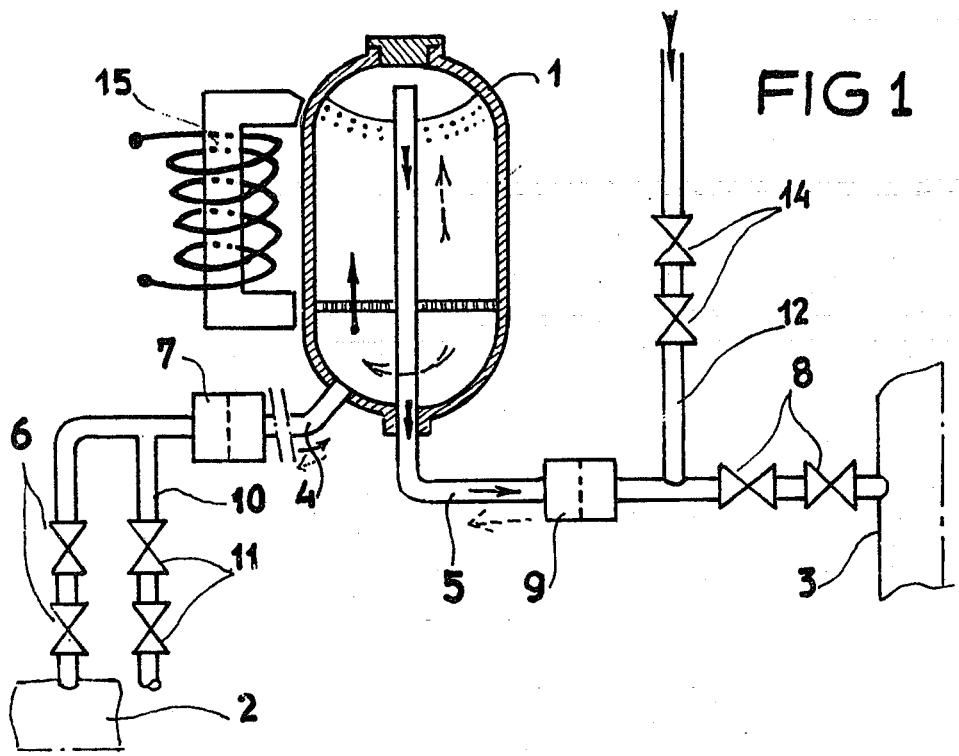

FIG. 1 shows the filter 1, which consists of a cylindrical envelope closed by means of two hemispherical plates, this filter, which will be described in greater detail with reference to FIG. 2, being arranged in a filtering circuit intercalated between pipes 2 and 3 of the primary circuit of a nuclear reactor using pressurized water. The two sections of piping 2 and 3 of the primary circuit are chosen such that there is a sufficient pressure difference between these two points in the circuit to ensure circulation of the primary water inside the filtering circuit.

For example, two different methods of connection have been envisaged in French Patent Application No. 78/28,525.

In one of these methods of connection, the pipes 2 and 3 are located on either side of a primary pump, and in the other method of connection, the filtering circuit is intercalated between the cold side, at the inlet of the vessel, and the upper part of this vessel.

FIG. 1 also shows the direction of circulation of the primary water in the filtering circuit. Thus, the primary water penetrates into the filter via a pipe 4 which is connected to the pipe 2 of the primary circuit, with the interposition of two shut-off valves 6 and of a mechanical filter 7 for stopping any migrating bodies which originate from fragmentation of the beads and which are likely to be entrained accidentally by the fluid.

After having passed through the filter, the purified primary water leaves via a pipe 5 which is connected to the pipe 3 of the primary circuit, with the interposition of two shut-off valves 8 and of a mechanical filter 9.

A pipe 10, which is connected to an unrepresented discharge vessel via valves 11, is arranged as an offtake on the pipe 4.

A pipe 12, which is connected to a pressurized water reservoir (not shown), is also arranged as an off-take on the pipe 5, with the interposition of valves 14.

The pipes 10 and 12 are used during the operations involving unclogging of the filter, which operations will be described below.

The bed of beads is magnetized by means of magnetic coils, such as 15, arranged at the periphery of the filter 1.

Figure 2:
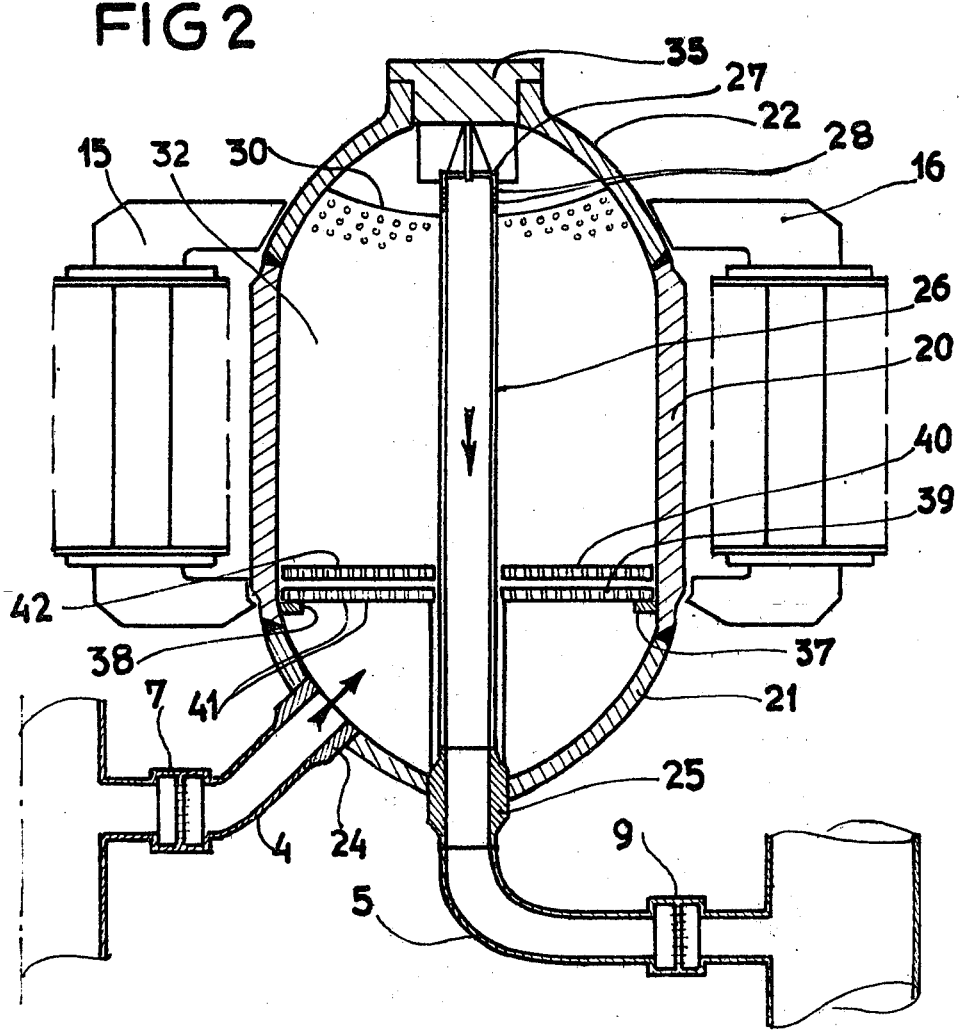
FIG. 2 shows a view of the filter in section through a vertical axial plane.

With reference to FIG. 2, it is seen that the filter 1 consists of a cylindrical shell 20 which is closed at each of its ends by means of a hemispherical plate 21 (lower plate) and a hemispherical plate 22 (upper plate).

The filter is arranged in the filtering circuit with its axis vertical; each of the plates 21, 22 is welded to the ends of the shell 20.

Pipe-joining members 24 and 25 are also arranged in the lower plate 21 to enable the pipes 4 and 5, respectively, to be jointed by welding.

The joining member 25 is extended by means of a pipe section 26 which is arranged approximately vertically along the axis of the filter 1.

The pipe 26 is closed at its upper end and the side wall of its upper end part 27 is provided with holes or orifices 28. The upper part 27 of the pipe 26 thus constitutes a strainer which is arranged above the upper level 30 of a bed of steel beads 32 and makes it possible to filter the primary fluid.

In fact, when the magnetizing coils, such as 15 and 16, arranged at the periphery of the filter 1, are fed, the magnetization of the magnetic steel beads 32 constituting the bed causes the formation of a curved surface 30 at the upper part of the bed of beads, leaving the upper part 27 of the pipe 26 entirely free.

The upper end of the strainer 27 is engaged in the hollow lower part of a sealing plug 35 which is detachably fixed to the upper plate 22 of the filter 1.

In this manner, the pipe 26 is held in its axial position inside the filter.

Supports, such as 37 and 38, are welded to the lower end of the cylindrical part 20 of the filter 1 and support plates 39 and 40 inside the filter, which support plates extend transversely over the whole cross-section of the filter, around the pipe 26.

The lower support plate 39 possesses holes 41 therethrough over its entire extent, which allow the fluid to pass through whilst at the same time avoiding excessive pressure losses.

This support plate 39 also supports the upper plate 40 on which the bed of beads 32 rests.

Figure 3:
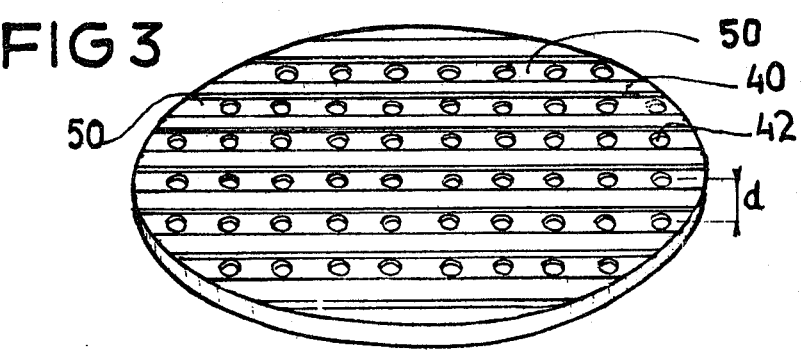
FIG. 3 shows a view, in perspective, of the plate for supporting the beads.

As shown in FIG. 3, the plate 40 for supporting the beads possesses grooves 50 on its upper face in contact with the beads, which grooves are directed along chords of this circular-shaped support plate 40. Cylindrical holes 42 open in the bases of these grooves 50 and extend through the support plate 40. The diameter of these holes is slightly less than the width of the grooves. This diameter is also less than the diameter of the beads, in order to prevent these beads from passing through the support plate 40.

For example, in the case of beads having a diameter of 6 to 6.5 mm, these holes can have a diameter of 5 mm.

Taking account of the width of the grooves and of the diameter of the beads, the depth of the grooves is chosen so that the cylindrical holes 42 can never be blocked by the beads, even if these beads come to rest above the holes, inside the grooves.

Likewise, the interaxial distance d between the grooves is chosen to be different from a multiple of the diameter of the beads, so that the arrangement of the beads in one groove does not automatically decide the arrangement of the other beads, constituting the lower layer of the bed of beads, in the other grooves.

The whole filter is made of non-magnetic, austenitic stainless steel with the exception of the plates for supporting the beads, which support plates are made of magnetic stainless steel.

Likewise, the beads are obviously made of magnetic stainless steel.

It is seen that the pipe 4, which is the inlet pipe for the fluid in the embodiment shown in FIGS. 1 and 2, passes through the lower plate 21 and opens in a free zone of this filter between the support plate 39 and the lower plate 21.

In this way, the water to be purified fills this free space first, before being sent under pressure through the support plates 39 and 40 and the bed of beads 32.

Figure 4:
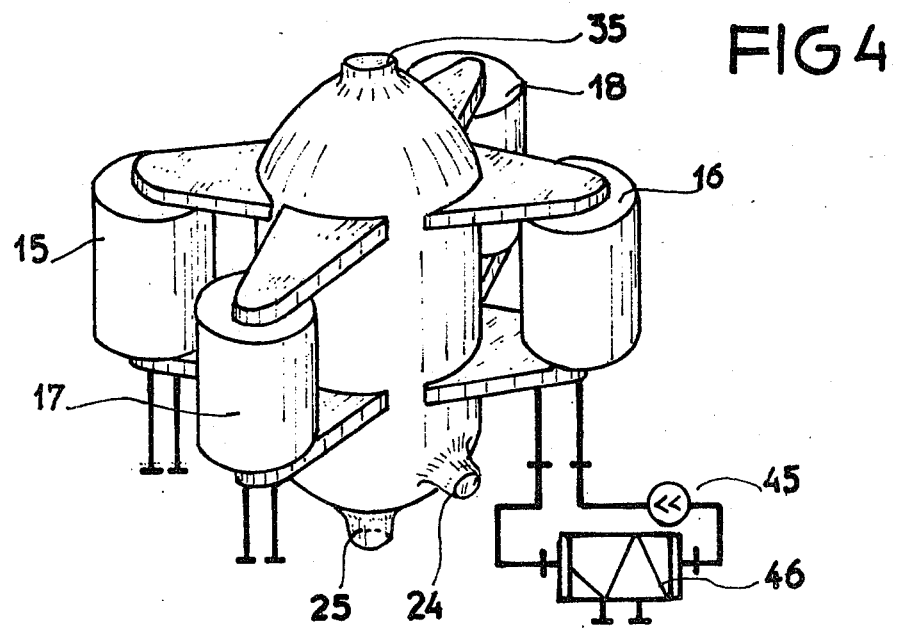
FIG. 4 shows a view, in perspective, of the filter and of its magnetizing device.

FIGS. 2 and 4 show that the device for magnetizing the filter consists of four coils 15, 16, 17 and 18 each comprising one actual winding and a C-shaped magnetic circuit.

Each of the magnetizing coils is fed with electric current and comprises a cooling circuit, such as the circuit shown in FIG. 4, which includes a circulating pump 45 and a cooling-liquid reservoir 46.

The four electromagnets constituting the device for magnetizing the filter are arranged at 90° at the periphery of this filter, the ends of the C-shaped magnetic circuits being very close to the cylindrical outer surface of the filter.

The device operates as follows:

When operation commences, the valves 6 and 8 are opened, allowing the pipes 2 and 3 of the primary circuit to communicate with the filtering circuit. The difference in the pressure of the water in the pipes 2 and 3 then enables the water to circulate into the pipe 4, through the filter and into the pipe 5, returning into the pipe 3 after purification.

Also, when the installation is started up, the bed of beads 32 is magnetized for one minute by feeding the electromagnets with a current which is such that the magnetic field would have a value of 3,200 Oersted in the absence of beads in the filter. The exciting current for the electromagnets is then adjusted to a value which is such that the field would have a value of 1,800 Oersted in the absence of beads in the filter.

Field gradients are formed inside the interstices existing between the beads, with the result that, when the water to be purified passes through the filter, the magnetic oxide particles suspended in the primary water are attracted towards the regions of strongest field and remain fixed to the beads.

The flow of primary water which enters through the lower part of the filter by means of the inlet pipe 4 is distributed, by the support plates 39 and 40, over the whole cross-section of the filter and circulates vertically in the filter, by virtue of the pressure difference between the pipes 2 and 3, as far as the upper part of the bed of beads, where the water which has been purified of its magnetic oxide particles flows between the curved upper level 30 of the bed of beads 32 and the upper plate 22 of the filter.

The purified water then passes through the holes 28 provided in the lateral surface of the strainer 27 of the pipe 26 and is discharged towards the pipe 3 of the primary circuit via the pipe 5.

The mechanical filters 7 and 9 make it possible to stop the migrating bodies consisting of fragments of beads which may have been conveyed by the primary fluid. These mechanical filters are interposed between the filter and the valves for isolating the circuit, so that the filter can always be isolated whilst at the same time preventing the valves from becoming blocked by the migrating bodies.

After a certain operating time, the amount of oxide particles present in the bed of beads can be prohibitive and makes it necessary to unclog the filter.

To effect this unclogging, the filter is isolated from the primary loop by shutting the valves 6 and 8, and the bed of beads is demagnetized by means of programmed reversal and reduction of the value of the current in the coils. In this way, the residual field is reduced to a value of zero.

The isolation valves 11 between the filter and the discharge reservoir are then opened. During discharge, a two-phase water/steam emulsion is produced inside the filter and this causes detachment of the oxide particles from the surface of the beads. The flow of the two-phase emulsion takes place in the opposite direction to the normal flow because the partially vaporized water under pressure is discharged through the pipe 4 which, in normal operation, is the pipe for introducing the pressurized water into the filter.

The filter fills with steam, and the unvaporized liquid phase finds its way into the discharge reservoir. The equilibrium pressure and temperature depend on the respective volumes of the filter and of the discharge reservoir.

The filter is then isolated from the discharge reservoir by shutting the valves 11, and the water present in the reservoir is cooled by spraying or by actuating a cooling circuit arranged around the discharge reservoir. The filter is then brought into communication with the reservoir for storing the water under pressure and at high temperature, by opening the valves 14, with the result that the filter fills with water at high temperature and at high pressure.

The device is then ready for a further expansion operation. In order to ensure satisfactory unclogging of the filter, three or four successive expansion operations must be carried out. When the unclogging operation has ended and the filter has filled with water at high pressure and at high temperature, communication between the filtering circuit and the primary circuit is re-established by opening the valves 6 and 8.

If, during the periods in which the filter is not in operation, it is desired to inspect the upper part of the bed of beads and to sample the charge of beads, it suffices to remove the plug 35, located at the upper part of the filter in the plate 22, in order to gain access to the bed of beads.

It is not therefore necessary to disconnect the pipe for introducing the primary fluid into the filter and the pipe for discharging it therefrom.

By virtue of the opening provided in the plate 22, which opening is closed by the plug 35, it is also possible to change the charge of beads in the bed just before bringing the apparatus into service and to replace this charge with the aid of remote-controlled devices, this precaution being necessary because the charge of beads possesses a certain nuclear activity after the filter has been operating.

It is seen that access to the bed of beads is extremely easy because the upper plate of the filter does not carry any inlet pipe or outlet pipe for the fluid to be purified, and because no member of the filter is located between the upper plate and the level of the bed of beads.

Furthermore, despite an extremely simple structure, the filter has a very high degree of effectiveness because the fluid to be treated is distributed over the whole surface of the filter by virtue of the support plate 39 which is provided with holes over its entire surface. Moreover, the purified fluid is carried away through a strainer-type device which makes it possible to prevent the re-introduction of contaminating particles into the purified fluid, the latter being carried out of the filter via a pipe which is completely isolated from the mass of beads.

In addition, in the embodiment which has been described, in which the fluid to be purified is introduced at a lower part of the filter and in which the purified fluid is discharged through a strainer located at an upper part of the filter, the re-entrainment of the oxide particles which have already been retained by the beads is prevented because the oxide particles tend to redeposit by gravity during the ascending motion of the fluid which is being purified in the filter.

Finally, the design of the magnetizing device comprising separate electromagnets permits greater reliability of service, easier dismantling of the magnetizing device and hence better accessibility to the filter.

Of course, the invention is not restricted to the embodiment which has now been described; on the contrary, it comprises all the variants thereof, and modifications in points of detail can be envisaged without thereby going outside the scope of the invention.

Thus, it is possible to use end plates of any shape, for example elliptical plates, instead of spherical plates as in the example which has been described. Instead of a detachable plug 35, it is possible to envisage an end plate which can be dismantled in its entirety, permitting access to the bed of beads over its whole surface. Likewise, it is possible to envisage a different structure as regards the arrangement of the support plates and of the pipe located axially in the filter.

It is also possible to envisage a different magnetizing device from that which has been described, in order to achieve an approximately uniform magnetization of the charge of beads.

Finally, although the preferred application of the device according to the invention is the purification of the pressurized water of a nuclear reactor, it is possible to envisage different applications of the device in the case of an industrial use of water at high temperature and at high pressure (for example in the case of nuclear reactors using boiling water or heavy water).

It is possible to use the filter according to the invention either in the way which has now been described, that is to say by introducing the water to be purified through the pipe emerging in the free space at the lower part of the filter, and by recovering the purified water at the upper part of the filter above the bed of beads, or by introducing the water through the axially directed pipe inside the filter, this water to be purified descending by gravity and by pressure into the bed of beads and collecting, after purification, in the free space at the lower part of the filter, and the purified water in this case being discharged through the pipe emerging in the free space at the level of the lower plate of the filter.

What is claimed is:

1. A filter for purifying water containing ferromagnetic particles and being at high pressure and at high temperature from a cooling circuit of a nuclear reactor cooled with water, said filter comprising
    a cylindrical envelope having a vertical axis of symmetry;
    upper and lower plates closing the ends of said envelope, at least the lower plate being convex and said upper plate being provided with an opening;
    a bed of steel beads within said envelope;
    means provided at the periphery of said envelope for magnetizing said beads;
    a plug disposed in the opening in said upper plate to provide access to the upper level of said bed of beads situated immediately under said upper plate;
    at least one support plate for supporting said beads in said envelope, said support plate being provided with holes, being arranged transversely to said axis of said envelope, and being spaced from said lower plate so that a free space is created between said support plate and said lower plate;
    an inlet pipe for water to be purified passing through said lower plate at a location different from the central part of said lower plate and opening into said free space; and
    an outlet pipe for purified water passing through said lower plate and extending substantially vertically through said bed of beads and coming into engagement with said plug immediately under said upper plate, said outlet pipe being closed at its upper part and being provided with holes in the lateral surface of the part thereof located above said bed of beads for the passage of water, said beads occupying the major part of the internal volume of said envelope and said water to be purified being equally distributed in all the sections of the filter in the free space under said lower plate.

2. The filter according to claim 1 wherein the axis of the part of said outlet pipe passing vertically through the bed of beads coincides with the vertical axis of said filter.

3. The filter according to claim 1 or 2 wherein said support plate is circular and is provided with grooves in its upper face for contact with said beads, said grooves extending along chords of said support plate and having depth and width which, relative to the diameter of said beads, are such that said beads cannot block holes opening in the bottom of said grooves.

4. The filter according to claim 1 or 2 wherein said magnetizing means comprises a set of electro-magnets which comprise a coil and a C-shaped magnetic circuit and are arranged around said envelope.

* * * * *